United States Patent
Gaertner et al.

(10) Patent No.: US 8,589,724 B2
(45) Date of Patent: Nov. 19, 2013

(54) RAPID REBUILD OF A DATA SET

(75) Inventors: Mark Allen Gaertner, Vadnais Heights, MN (US); Tyler Ki Soo Gordon, Holden, MA (US)

(73) Assignee: Seagate Technology LLC, Cupertino, CA (US)

( * ) Notice: Subject to any disclaimer, the term of this patent is extended or adjusted under 35 U.S.C. 154(b) by 274 days.

(21) Appl. No.: 13/174,050

(22) Filed: Jun. 30, 2011

(65) Prior Publication Data
US 2013/0007511 A1   Jan. 3, 2013

(51) Int. Cl.
*G06F 11/00* (2006.01)

(52) U.S. Cl.
USPC .............. 714/6.22; 714/6.24; 714/6.32

(58) Field of Classification Search
USPC ................. 714/6.2, 6.22, 6.24, 6.32
See application file for complete search history.

(56) References Cited

U.S. PATENT DOCUMENTS

| | | | |
|---|---|---|---|
| 5,208,813 A | 5/1993 | Stallmo | |
| 5,313,626 A | 5/1994 | Jones et al. | |
| 5,357,509 A | 10/1994 | Ohizumi | |
| 5,826,001 A | 10/1998 | Lubbers et al. | |
| 6,654,912 B1 | 11/2003 | Viswanathan et al. | |
| 7,287,182 B2 * | 10/2007 | Tanaka et al. | 714/6.2 |
| 7,434,097 B2 * | 10/2008 | Guha et al. | 714/6.32 |
| 7,647,526 B1 * | 1/2010 | Taylor | 714/6.32 |
| 8,049,980 B1 * | 11/2011 | Emami | 360/31 |
| 8,433,947 B2 * | 4/2013 | Noguchi et al. | 714/6.2 |
| 2002/0162057 A1 | 10/2002 | Talagala | |
| 2005/0081087 A1 * | 4/2005 | Yagisawa et al. | 714/5 |
| 2005/0283654 A1 | 12/2005 | Wood et al. | |
| 2006/0117216 A1 * | 6/2006 | Ikeuchi et al. | 714/6 |
| 2007/0220313 A1 * | 9/2007 | Katsuragi et al. | 714/6 |
| 2012/0317439 A1 * | 12/2012 | K. et al. | 714/6.22 |

* cited by examiner

Primary Examiner — Marc Duncan
(74) Attorney, Agent, or Firm — Hall Estill Attorneys at Law

(57) ABSTRACT

A method and apparatus for rebuilding a data set. In accordance with some embodiments, a data storage device is coupled to a host. An error condition associated with a memory of the data storage device is detected. Data stored in a first portion of the memory unaffected by said error condition is transferred to the host. A communication signal is output to the host that indicates that data stored in a second portion of the memory affected by said error condition will not be transferred to the host. The host reconstructs the data stored in the second portion of the memory responsive to the communication signal.

20 Claims, 9 Drawing Sheets

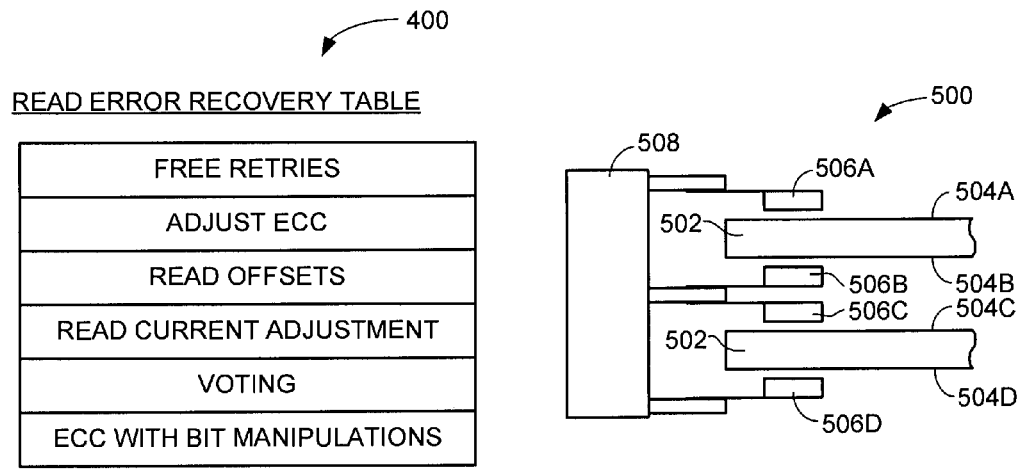
FIG. 4
FIG. 5
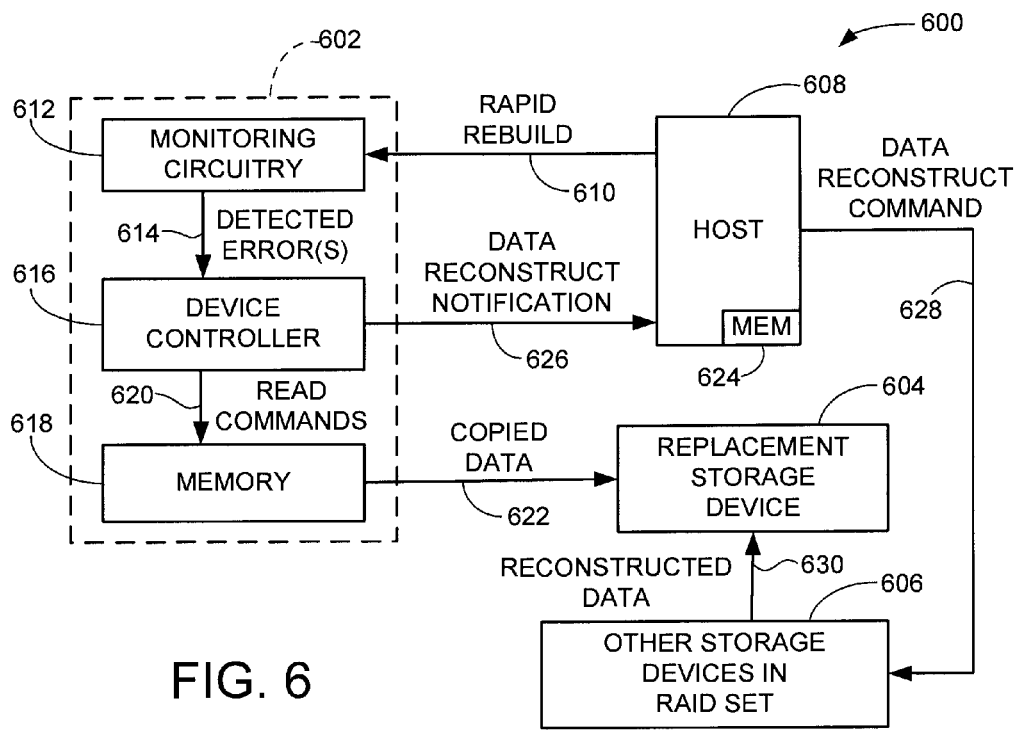
FIG. 6

SAS SEND DIAGNOSTIC COMMAND TO ENABLE RAPID REBUILD MODE

| Byte \ Bit | 7 | 6 | 5 | 4 | 3 | 2 | 1 | 0 |
|---|---|---|---|---|---|---|---|---|
| 0 | Operation Code (0x1D - Send Diagnostic) ||||||||
| 1 | Function (0) ||| PF (1) | Rsvd (0) | Self Test (0) | DevOfl (0) | UnitOfl (0) |
| 2 | Reserved ||||||||
| 3 - 4 | Parameter List Length (0x14) ||||||||
| 5 | Control ||||||||

FIG. 8

SAS PARAMETER LIST FOR RAPID REBUILD DIAGNOSTIC PAGE

| Byte \ Bit | 7 | 6 | 5 | 4 | 3 | 2 | 1 | 0 |
|---|---|---|---|---|---|---|---|---|
| 0 | Page code (0xFB – Rapid Rebuild) ||||||||
| 1 | Reserved ||||||||
| 2 - 3 | Page Length (0x10) ||||||||
| 4 - 5 | Mapped Out Head Bitmap (optional) ||||||||
| 6 - 19 | Reserved ||||||||

FIG. 9

SAS DESCRIPTION OF RECEIVE DIAGNOSTIC RESULTS COMMAND

| Bit<br>Byte | 7 | 6 | 5 | 4 | 3 | 2 | 1 | 0 |
|---|---|---|---|---|---|---|---|---|
| 0 | \multicolumn{8}{c|}{Operation Code (0x1C – Receive Diagnostic Results)} |
| 1 | Reserved (0) ||||||| PCV (1) |
| 2 | Page Code (0xFB – Rapid Rebuild) ||||||||
| 3 - 4 | Parameter List Length (0x14) ||||||||
| 5 | Control ||||||||

FIG. 10

SAS RECEIVE RESULTS DIAGNOSTIC PAGE

| Bit<br>Byte | 7 | 6 | 5 | 4 | 3 | 2 | 1 | 0 |
|---|---|---|---|---|---|---|---|---|
| 0 | Page code (0xFB) ||||||||
| 1 | Reserved ||||||||
| 2 – 3 | Page Length (0x10) ||||||||
| 4 – 5 | Mapped Out Head Bitmap ||||||||
| 6 | Reserved ||||||| Enabled |
| 7 – 19 | Reserved ||||||||

FIG. 11

SATA WRITE LOG EXTENDED COMMAND TO ENABLE RAPID REBUILD

| Name | Description | |
|---|---|---|
| Feature | Reserved | |
| Count | 1 block (512 bytes will be transferred) | |
| LBA | Bit | Description |
| | 47:40 | Reserved = 0 |
| | 39:32 | Page number (15:8) = 0 |
| | 31:16 | Reserved = 0 |
| | 15:8 | Page number (7:0) = 0 |
| | 7:0 | Log Address = FBh |
| Device | Bit | Description |
| | 7 | Obsolete |
| | 6 | N/A |
| | 5 | Obsolete |
| | 4 | Transport Dependent |
| | 3:0 | Reserved |
| Command | Bit | Description |
| | 7:0 | Command = 3Fh |

FIG. 12

SATA WRITE LOG EXTENDED DATA

| Bit / Byte | 7 | 6 | 5 | 4 | 3 | 2 | 1 | 0 |
|---|---|---|---|---|---|---|---|---|
| 0 - 1 | Mapped Out Head Bitmap (optional) | | | | | | | |
| 2 - 511 | Reserved | | | | | | | |

FIG. 13

SATA READ LOG EXTENDED COMMAND WITH RAPID REBUILD STATUS

| Name | Description | |
|---|---|---|
| Feature | Reserved | |
| Count | 1 block (512 bytes will be transferred) | |
| LBA | Bit | Description |
| | 47:40 | Reserved = 0 |
| | 39:32 | Page number (15:8) = 0 |
| | 31:16 | Reserved = 0 |
| | 15:8 | Page number (7:0) = 0 |
| | 7:0 | Log Address = FBh |
| Device | Bit | Description |
| | 7 | Obsolete |
| | 6 | N/A |
| | 5 | Obsolete |
| | 4 | Transport Dependent |
| | 3:0 | Reserved |
| Command | Bit | Description |
| | 7:0 | Command = 2Fh |

FIG. 14

SATA READ LOG EXTENDED DATA WITH RAPID REBUILD STATUS

| Bit / Byte | 7 | 6 | 5 | 4 | 3 | 2 | 1 | 0 |
|---|---|---|---|---|---|---|---|---|
| 0 – 1 | Mapped Out Head Bitmap ||||||||
| 2 | Reserved ||||||| Enable |
| 3 – 511 | Reserved ||||||||

FIG. 15

SATA QUEUED ERROR LOG DATA STRUCTURE

| Byte | 7 | 6 | 5 | 4 | 3 | 2 | 1 | 0 |
|---|---|---|---|---|---|---|---|---|
| 0 | NQ | UNL | R | TAG | | | | |
| 1 | Reserved | | | | | | | |
| 2 | Status | | | | | | | |
| 3 | Error | | | | | | | |
| 4 | Error LBA(7:0) | | | | | | | |
| 5 | Error LBA(15:8) | | | | | | | |
| 6 | Error LBA(23:16) | | | | | | | |
| 7 | Device | | | | | | | |
| 8 | Extended Error LBA(31:24) | | | | | | | |
| 9 | Extended Error LBA(39:32) | | | | | | | |
| 10 | Extended Error LBA(47:40) | | | | | | | |
| 11 | Reserved | | | | | | | |
| 12 | Count(7:0) | | | | | | | |
| 13 | Extended Count(15:8) | | | | | | | |
| 14 | Reserved | | | | | | | |
| 15 | Reserved | | | | | | | |
| 16 | Reserved | | | | | | | |
| 17 | Reserved | | | | | | | |
| 18 | Reserved | | | | | | | |
| 19 | Reserved | | | | | | | |
| 20 ... 255 | Reserved | | | | | | | |
| 256 | Next Accessible LBA(7:0) * | | | | | | | |
| 257 | Next Accessible LBA(15:8) * | | | | | | | |

FIG. 16A

SATA QUEUED ERROR LOG DATA STRUCTURE (CONTINUED)

| 258 | Next Accessible LBA(23:16) * |
|---|---|
| 259 | Extended Next Accessible LBA(31:24) * |
| 260 | Extended Next Accessible LBA(39:32) * |
| 261 | Extended Next Accessible LBA(47:40) * |
| 262 ... 510 | Vendor Specific |
| 511 | Data Structure Checksum |

FIG. 16B

TRACK 0

| LBAs 0-999 (HEAD 0) |
|---|

TRACK 1

| LBAs 1000-1999 (HEAD 1) |
|---|

TRACK 2

| LBAs 2000-2999 (HEAD 0) |
|---|

FIG. 17

RAPID REBUILD OF A DATA SET

SUMMARY

Various embodiments of the present invention are generally directed to a method and apparatus for rebuilding a data set.

In accordance with some embodiments, a data storage device is coupled to a host. An error condition associated with a memory of the data storage device is detected. Data stored in a first portion of the memory unaffected by said error condition is transferred to the host. A communication signal is output to the host that indicates that data stored in a second portion of the memory affected by said error condition will not be transferred to the host. The host reconstructs the data stored in the second portion of the memory responsive to the communication signal.

These and other features and advantages which characterize the various embodiments of the present invention can be understood in view of the following detailed discussion and the accompanying drawings.

BRIEF DESCRIPTION OF THE DRAWINGS

FIG. 4 is a format for an exemplary read error recovery table.

FIG. 5 represents a disc-based data storage device operated in accordance with various embodiments.

FIG. 6 shows another data storage device operated in accordance with various embodiments.

FIG. 8 shows a format for a diagnostic command issued by a SAS controller in accordance with various embodiments.

FIG. 9 is a SAS parameter list format.

FIG. 10 provides a received results format for the command of FIG. 8.

FIG. 11 illustrates an exemplary SAS diagnostics page results corresponding to FIG. 9.

FIG. 12 is a write log extended command format for a SATA controller in accordance with various embodiments.

FIG. 13 is a format for write log extended data corresponding to FIG. 12.

FIG. 14 provides a SATA read log extended command format.

FIG. 15 shows a SATA read log status format.

FIG. 16 is a SATA queued error log data structure.

FIG. 17 illustrates various tracks from another device operated in accordance with various embodiments.

DETAILED DESCRIPTION

The present disclosure generally relates to the rebuilding of a data set from a data storage device. Data redundancy techniques can be employed in data storage systems to enhance the ability of a user to recover previously stored data. One commonly employed technique is the use of RAID (redundant array of independent discs). A RAID array allows a particular data set to be stored across multiple data storage devices such as through data mirroring (RAID-1), data striping with parity (RAID-5), etc. Other, non-RAID based data redundancy techniques can be used as well, such as by making periodic backup copies of a data set on a separate memory (e.g., a backup disc, tape, remote storage, etc.).

While operable, the use of conventional data redundancy techniques to rebuild a data set can be time and resource intensive. For example, using parity codes to reconstruct all of the data from a failed device in a RAID set can require numerous calculations and memory swaps, and can reduce the ability of the array to process ongoing requests that arise in the interim. Similarly, locating and accessing a backup copy of a data set can be inconvenient and may not provide the most recent copy of the data set if updates were made to the data set after the most recent backup operation.

Accordingly, various embodiments disclosed herein are generally directed to reducing the time and effort required to rebuild a data set from a storage device having a detected error condition. Different portions of memory in the device are characterized in terms of their respective data recovery characteristics. Generally, data from portions of the memory that can be readily transferred are copied over to an external memory. Data from portions of the memory that may require enhanced data recovery efforts are instead reconstructed using an external mechanism.

Should the external data reconstruction effort be unsuccessful, the device can proceed with enhanced data recovery efforts in an attempt to recover the data from the device memory. In this way, the device can delay, and possibly avoid, the use of enhanced recovery operations until such efforts are actually necessary.

The rapid rebuild processing disclosed herein can further improve the probability that a data set can be successfully recovered. The probability of successful recover is increased because there is no loss of redundancy for those parts of the data set that can be copied over from the failed device.

Figure 1:
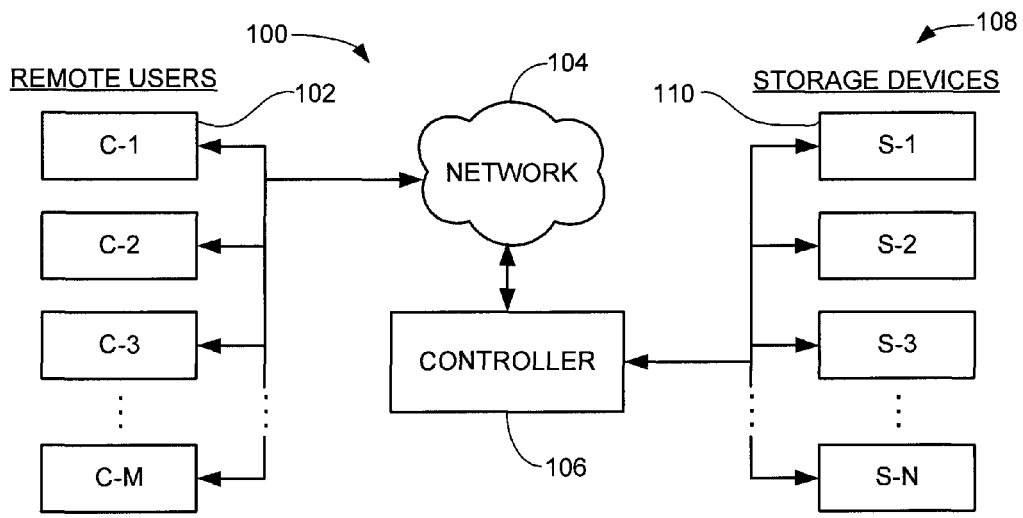
FIG. 1 is a functional block representation of a data processing system.

To explain these and various other features of various embodiments, FIG. 1 shows a functional block diagram for an exemplary data processing system 100. The system 100 is characterized as a networked computer system in which multiple remote users access data stored in a multi-device data storage array.

The system 100 includes M user devices (computers) 102, respectively denoted as C-1 to C-M. The user devices 102 can take any suitable form(s), including personal computers (PCs), workstations, hand-held portable electronic devices, tablets, smart phones, and so on. The user devices 102 communicate with a network fabric 104.

The fabric can take any suitable form and may be a local area network (LAN), the Internet, a wireless (WIFI) based network, etc. Other interconnections can be used as well, including non-network based communications.

An array controller 106 is connected to the fabric 104, and provides top level data management control over a data storage array 108. The array 108 includes N data storage devices 110, denoted S-1 to S-N. The storage devices 110 can take any suitable form(s), including but not limited to hard disc drives (HDDs), optical drives, solid state drives (SSDs), flash memory devices, and so on.

Figure 2:
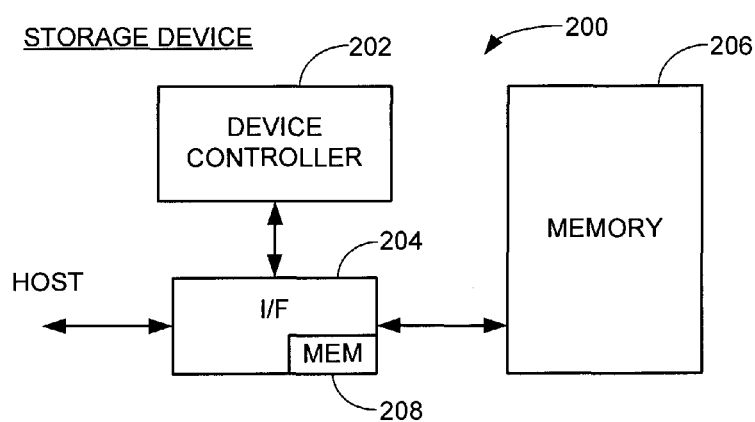
FIG. 2 is a block diagram representation of an exemplary data storage device.

FIG. 2 shows an exemplary arrangement for a data storage device 200 that may be incorporated into the array 108 in FIG. 1. The device 200 includes a device controller 202, which may be realized as a programmable processor or in hardware. An interface (I/F) circuit 204 provides a communication and data transfer path between a host device and a main memory 206. The main memory 206 may be volatile or non-volatile. The I/F circuit 204 may include local memory 208, which may be used for a variety of functions such as hierarchical caching during data transfers, the storage of metadata or other control information, and the storing of programming and routines used by the device controller 202.

Figure 3A:
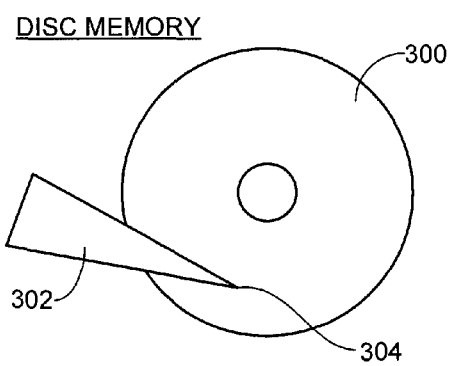
FIG. 3A shows a disc-based memory.

FIG. 3A shows a disc-based memory 300 that can be used as the main memory 206 in FIG. 2. The memory 300 includes a rotatable data storage medium 302. Data are stored to each recording surface of the medium 302 along concentric data tracks (not separately shown). A moveable actuator 304 aligns an associated read/write transducer (head) 306 with the tracks to carry out data read and write operations.

Figure 3B:
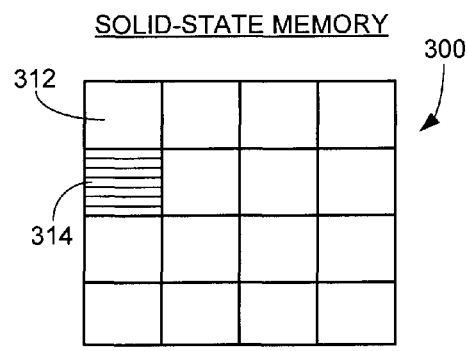
FIG. 3B depicts a solid-state memory.

FIG. 3B shows an alternative solid-state memory 310 suitable for use as the main memory 206 in FIG. 2. The memory 310 comprises semiconductor memory cells arranged into rows and columns. The cells may be grouped into erasure blocks 312 which are allocatable as required by the system and erased as a unit. Each erasure block 312 may in turn be formed as a set of individually accessible pages 314 (e.g., rows of memory cells that are written to or read as a unit).

For purposes of the present discussion, it will be contemplated that the system 100 of FIG. 1 uses disc-based data storage devices 110 configured as depicted in FIGS. 2 and 3A. The devices 110 are grouped in a RAID-5 configuration, so that each data set stored to the RAID-5 group is broken up into RAID stripes that are written to respective devices in the group, and parity codes for the data set are written to a separate device in the group. It will be appreciated that exemplary arrangement is merely for purposes of providing a concrete example and is not limiting. For example, the various embodiments presented herein can be used with other types of storage devices, such as solid-state memories including as depicted in FIG. 3B. The various embodiments presented herein can also be utilized in non-RAID based systems, including systems that utilize a single data storage device.

Data may be stored by the individual devices 110 in the exemplary RAID group in any suitable manner. In some embodiments, write data will be presented to a selected device 110 by a host (such as the controller 106) with a write command instructing the device 110 to store the data at a selected location (e.g., a selected logical address in the disc media). The device may undertake several processing steps in order to store the data, such as by identifying a corresponding physical address to which the data should be stored and moving an associated transducer to a position adjacent the physical address. The data may be encoded and serialized to provide a write signal that is applied to the write transducer to write the encoded data to the physical address. The encoding of the write data by the device 110 can take a variety of forms, such as the appending of error correction codes (ECC), the use of run length limited (RLL) codes, the application of data encryption techniques, etc.

During a subsequent read operation, a host (such as the controller 106) provides a read command to the selected device 110. The device may undertake a variety of steps during the servicing of the read command, such as by locating the physical address where the requested data are stored, moving the associated read transducer to this physical address, using the read transducer to transduce a read signal, applying signal processing techniques to the read signal to obtain a set of digitally expressed recovered data, and applying ECC recovery techniques to detect and correct any errors in the read data.

Under normal operating conditions, each selected device 110 in the group will generally be able to satisfactorily write to and read from the main memory of the device in accordance with the foregoing discussion in a fast and efficient manner. However, if the drive is unable to recover the data on-the-fly (e.g., in real time), the device 110 may initiate a read error recovery sequence.

FIG. 4 shows a read error recovery table 400 in accordance with some embodiments. The table 400 represents data and associated routines stored in suitable device memory, such as the device memory 208 in FIG. 2, and can be used by a selected device in the event of a read error condition during a data recovery operation. The routines listed in the read error recovery table 400 are merely exemplary, as any number of suitable routines can be used as desired. Although the routines can be executed in any desired order, in some embodiments the table represents a sequence of increasingly more powerful, and accordingly more time consuming, efforts that can be carried out in turn during the read data recovery effort.

The "free retries" entry in the table 400 generally comprises a sequence of re-reads of the associated physical address. During the free retries portion of the recovery effort, the device 110 simply attempts to reread the data. No parametric changes to the system are generally made. The number of free retries can be any suitable value, such as from 2-10 retries. In many cases, a simple free retry is sufficient to recover the stored data.

The "adjust ECC" entry in the table 400 generally comprises the use of different, higher powered ECC recovery techniques. This may include different algorithms using the same recovered ECC codes, the use of secondary, higher order ECC codes (e.g., multi-sector parity codes, etc.) that are not normally used until needed, and so on.

The "read offsets" entry in the table 400 generally involves adjustments to the physical positioning of the read transducer relative to the associated track. This may help in situations where the data were not written to the center of the track (and is therefore offset to one side of the center of the track or the other), or in cases where a media defect, adjacent data, or some other condition reduces the ability of the read transducer to accurately transduce the data from the associated track.

The "read current adjustment" routine generally involves adjusting the read bias current that is applied to the read transducer. Other parametric adjustments, such as gain values, timing values, etc. can also be carried out in this routine. The "voting" routine generally involves reading back the data multiple times and setting individual bits based on a majority vote. The "ECC with bit manipulations" routine generally involves changing individual bits in a read sequence to see if the ECC can improve the recovery of the data.

Regardless of the type and extent of the routines in a given read error recovery table, it will be appreciated that the use of a table such as 400 can enable a storage device to successfully recover data from a memory during the servicing of a read command. Once such a table is employed and the data are successfully recovered, depending on the effort required to recovery the data, the device may take further steps to deallocate the sector and relocate the data within the device to a new location. This may tend to reduce the need to use enhanced recovery efforts the next time a host requests the data.

While read error recovery techniques as shown in FIG. 4 can be effective in recovering relatively smaller amounts of data, such as the data from one or more data sectors, the use of such techniques to recover relatively larger amounts of data from a device may not often be practical. For example, it has been found in some cases that the full application of a table such as 400 can require on the order of around two (2) seconds or more of elapsed time per data sector. Because each track on a disc-based memory may store hundreds of individually addressable data sectors, and each recording surface may in turn have hundreds of thousands of tracks, a significant amount of time may be required to sequentially apply the read error recovery table to a large number of the sectors on a data recording surface.

Accordingly, various embodiments of the present invention generally operate to avoid the application of enhanced error recovery techniques in situations where the data may be recovered using alternative techniques. The enhanced error recovery techniques may be thereafter used for those data blocks for which the alternative techniques were unsuccessful in reconstructing the data.

By way of illustration, FIG. 5 represents a disc-based data storage device 500. The device 500 has a general form as previously set forth in FIGS. 2 and 3A, and includes two (2) axially aligned magnetic recording discs 502 with a total of four (4) data recording surfaces 504A-504D. An array of four (4) data read/write transducers 506A-506D are controllably positioned adjacent the recording surfaces 504A-504D using a common actuator 508.

It is contemplated that, at some point during the operation of the device 500, a decision is made to copy all of the data stored by the storage device 500 to a separate memory location, such as a standby replacement data storage device, controller memory, etc. This copying operation may be initiated by an external host device which sends a command to the device 500 to initiate outputting all of the data stored on the discs 502. In some embodiments, the host device may issue a succession of read commands that request various blocks of data in turn.

In the absence of any detected error conditions, the device 500 generally proceeds to sequentially transfer all of the data from the respective surfaces 504A-504D to the external memory location. However, in accordance with at least some embodiments, should the device 500 determine that there is an existing detected error condition associated with the device, the device 500 may segregate the memory into different portions in relation to whether such portions are, or are not, likely affected by such error condition.

By way of illustration, assume that the device determines that the top transducer 506A in FIG. 5 has an associated detected error condition. This may be a partial or complete failure of the transducer 506A, or simply an exhibited pattern of read errors or other degraded performance indicia. The device 500 operates to classify the first recording surface 504A with a first classification, such as "bad," and the remaining recording surfaces 504B-504D with a different, second classification, such as "good." The device 500 then proceeds to transfer the data from the "good" portions of the memory that are unaffected by the detected error condition (e.g., surfaces 504B-504D) while forgoing the attempted use of enhanced recovery techniques to recover the data from the "bad" portion of the memory that is affected by the detected error condition (e.g., surface 504A).

The device 500 can be configured to output a signal to an external host that indicates that the data from the first recording surface 504A are not going to be transferred. This signal can take any suitable form, including a read error status responsive to a read request command from the host. This signal enables the host to direct the reconstruction of the data from the first recording surface 504A using an external mechanism. In this way, the copying of the data from the device 500 is not delayed by the attempted use of enhanced error recovery techniques by the transducer 504A. This type of processing is generally referred to herein as rapid rebuild processing.

While the above example in FIG. 5 uses a failed transducer (e.g., transducer 506A), it will be appreciated that any number of detected error conditions can be used in determining which data are to be copied and which data are to be reconstructed externally. Moreover, while the detected error condition of the top transducer 506A in the above example could constitute a complete failure of the transducer, such is not necessarily required; instead, the top transducer 506A could simply exhibit an error rate performance (or some other metric) that is relatively worse than the other transducers 506B-506D, but is otherwise adequately operational.

Similarly, the "bad" and "good" portions of the memory might be arranged in any suitable fashion, such as individual sectors, individual tracks or groups of tracks, different zones, etc. In some embodiments the detected error condition may simply relate to the expected transfer rate not being sufficiently fast enough to justify the direct copying over of the data, if the data could be reconstructed faster externally. In such case, the innermost zone of tracks on each recording surface might be designated as "bad" and reconstructed externally, whereas other zones on the tracks with faster data I/O rates might be designated as "good" and copied directly.

The decision to copy all of the data from the device 500 may be a direct result of the detected error condition. For example, the "failed head" condition in FIG. 5 discussed above might be the reason the rapid rebuild process is initiated; the device 500 reports the error to the host and the host, in turn, initiates the rapid rebuild processing in response thereto. Alternatively, the decision to copy all of the data from the device 500 may be completely unrelated to the detected error condition. In this latter case, the internal analysis by the device 500 of the presence and extent of the detected error condition determines which data are copied and which data are reconstructed externally.

FIG. 6 provides a functional block diagram of an exemplary system 600 that can be operated to carry out rapid rebuild processing in accordance with further embodiments. The rapid rebuild processing generally operates to take a first storage device out of service and replace it with a second, replacement device. As with the example above in FIG. 5, a portion the data from the first storage device is copied, and another portion of the data from the first storage device is reconstructed externally. While a second, replacement storage device is contemplated, it will be appreciated that any suitable external memory location can be used.

The system 600 in FIG. 6 includes a first data storage device 602 that is to be taken out of service, a second, replacement data storage device 604 that is to take the place of the first storage device 602, additional data storage devices 606 that form a portion of a RAID group of which the first device 602 also forms a part, and a host device 608 that oversees the rebuild operation.

Generally, at the conclusion of the rapid rebuild processing of FIG. 6, the replacement data storage device 604 will store all of the data that were previously stored on the first device 602. The first storage device 602 can then be repaired, replaced, discarded, etc. The replacement storage device 604 can become a "permanent" member of the RAID group, or can be a temporary member until the first device 602 is repaired or replaced. Thus, the second storage device 604 can basically be any suitable memory, including a volatile or non-volatile storage device or array.

While the rapid rebuild sequence can take a variety of forms, in some embodiments the host 608 initiates a rapid rebuild communication with the first device 602, signaling a requirement that the first device 602 copy over all of the data stored in its main memory 610. This rapid rebuild command is illustrated by signal path 610 and may be sent via a normal communication pathway between the host 608 and the first device 602. This signal may be a simple initialization signal that prepares the device for a rapid rebuild process, followed by individual read commands to sequentially pull data from the first device.

In some embodiments, monitoring circuitry 612 of the first device 602 processes the rapid rebuild command and identify any detected error conditions associated with the operation of the first device 612. This information, denoted by path 614, is made available to a device controller 616. The monitoring circuitry 612 may form a part of, or be separate from, the controller 616. The monitoring circuitry 612 may accumulate long term history performance statistics relating to the operation of the device, so that the detected error conditions are identified from such accumulated data. Alternatively or additionally, the monitoring circuitry may identify specific failure modes that have been, or are currently being experienced by, the first device 602.

The controller 616 operates to analyze the detected error condition(s) and to apportion the memory space 618 (e.g., discs such as 502 in FIG. 5) into different portions. For those portions of the memory 618 deemed not affected by the detected error condition(s), the controller 616 initiates a sequence of read commands, path 620, causing the outputting of the copied data to the second storage device 604 via path 622. Alternatively, the host may forward read commands and the controller either services the command from a good location of the memory, or returns an error status if from a bad location of the memory. It will be appreciated that the copied data may be output to a different location, such as a local cache memory (MEM) 624 of the host 608, for subsequent transfer to the second device 604.

The controller 616 further operates to issue a data reconstruct notification signal to the host 608, as shown by path 626. The form of this notification signal can vary. In some embodiments, the signal identifies those portions of the contents of the memory 618 that are not being transferred during the copying operation, such as by listing various ranges of LBAs on an exception list, or by periodically providing read error signals to the host responsive a sequential data pull.

The host 608 operates responsive to the data reconstruct notification signal to initiate a reconstruction of the non-copied data from the first device 602. The data reconstruction operation can take a variety of forms, such as through the use of data stored in another location such as the other data storage devices 606 in the RAID set. In a RAID-5 environment, the striped data and parity codes on the remaining data storage devices may be used to reconstruct the missing non-copied data. In a RAID-1 environment, the mirrored data may be copied directly. A data reconstruct command may be issued by the host 608 as shown by path 628, and the reconstructed data may be transferred to the second device 604 via path 630.

While not shown in FIG. 6, it will be understood that, should the other devices 606 be unable to successfully provide the reconstructed data set to the second device 604, the host 608 may direct the first device 602 to initiate copying of some or all the data from the exception list. Depending on the state of the first device 602, enhanced read error recovery techniques may be required in order to recover this data and copy it to the second device 604.

Figure 7:
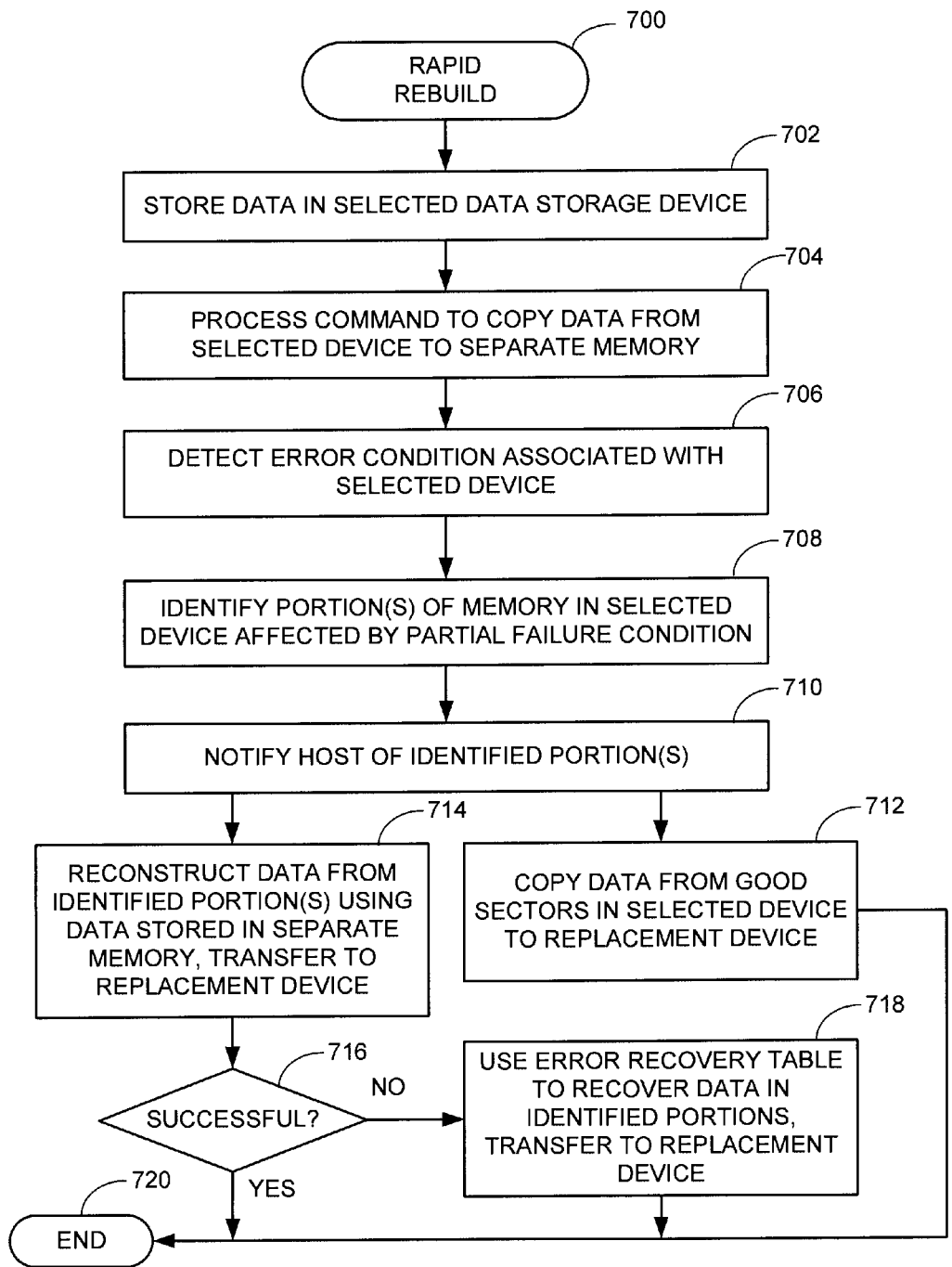
FIG. 7 is a flow chart for a RAPID REBUILD routine.

FIG. 7 provides a flow chart for a RAPID REBUILD routine 700 to show exemplary steps carried out in accordance with some embodiments. Data are initially stored in a selected data storage device, step 702. At step 704, a command is received or otherwise processed to initiate the rapid rebuild processing.

The device proceeds at step 706 to detect one or more error conditions associated with the selected device. The detected error condition(s) are used at step 708 to identify one or more portions of the memory of the selected device that are affected by the detected error condition(s), step 708. A host can be notified at step 710 of the affected portions of memory such as in the form of an exception list of data sectors that are not going to be initially copied over responsive to the copy command of step 704. Other preparatory steps can be taken by the device at this time, such as but not limited to write-protecting the data and limiting the read error recovery efforts to certain routines such as only free-retries.

At step 712, data from good (non-affected) portions of the memory are copied from the memory to a replacement device or other external memory location. Concurrently, data from bad (affected) portions of the memory are reconstructed using an external mechanism at step 714.

Decision step 716 determines whether the data reconstruction operation of step 714 was successful. If not, enhanced read error recovery techniques, such as an error recovery table, are used at step 718 by the selected device to copy the remaining data to the external memory. Once all of the required data are transferred to the separate memory, the process ends at step 720.

Rapid rebuild processing as set forth by FIG. 7 can facilitate time efficient reconstruction of the data from a failed device in a system, such as a RAID set, in scenarios where partial or full device operation is available or can be restored. As noted above, the processing can operate in at least some cases to save time that would otherwise be required to reconstruct the full data from other devices in the RAID set, or from other memory locations (e.g., a backup copy, etc.). Also, the rapid rebuild processing can enhance the probability that a given data set can be successfully recovered, since data redundancy is available for the copied-over data.

A host can activate the rapid rebuild processing during failed device recovery procedures. When activated, the processing characterizes the relative fitness of the device and optimizes behavior to enable rapid data recovery by the host. Device performance can be quantified in a variety of ways, such as monitored error rates on a per-head basis, and heads can be mapped out that exceed the error threshold during data recovery. The data associated with mapped out heads are made unavailable to the host, enabling the host to prioritize the recovery of blocks that are on the non-mapped out heads.

It is contemplated that an existing RAID system controller can be easily modified in view of the present disclosure to provide and process various feature-specific commands and responses, implications of mapped out LBA ranges, and various status and feature override capabilities. Any number of different interface communication schemes (e.g., SAS, SATA, Fibre Channel, etc.) can be adapted to use the techniques discussed herein.

To provide further concrete examples, the following is a brief discussion of exemplary implementations of rapid rebuild processing capabilities for SAS (serial SCSI) and SATA (serial ATA) based RAID systems, respectively. It will be appreciated that these are just some of a variety of ways in which the various embodiments disclosed herein can be implemented in a data storage system.

To enable a rapid rebuild mode in a SAS environment, a host (such as 608 in FIG. 6) may begin by issuing a SAS Send Diagnostic command to a selected device, such as the device 602 in FIG. 6. The Send Diagnostic command can take any suitable format, such as but not limited to the exemplary format in FIG. 8. The command may be forwarded with a parameter list for a Rapid Rebuild Diagnostic Page, such as shown by the exemplary format of FIG. 9.

If the selected device is not currently in an active state (e.g., a sleep mode), the device will attempt to spin up or otherwise return to an operationally ready mode. The device may provide a status, such as shown in respective receive diagnostic formats of FIGS. 10 and 11. The status may indicate that the device is at least partially responsive (e.g., has at least one operational head) and therefore able to proceed with rapid rebuild processing, or the status may indicate that the device is unable to return to an operationally ready mode. In this latter case, the host may discontinue further communications with the selected device, and instead proceed to direct a reconstruction of all of the data on the device using conventional processing.

If the device is able to proceed, it will enter a Rapid Rebuild mode and may carry out various initial steps such as to minimize background activities, test all heads, write-protect the media, and limit error recovery steps to free retries. The Rapid Rebuild mode will persist through any bus resets and remain active until the device is power-cycled by the host.

In some embodiments, the host device may direct the outputting of the copied data by issuing a sequential read workload to extract the available data from the device, although such is not necessarily required. Any suitable data exchange format between the device and the host can be used as the copied data are transferred over to the host by the device.

A Mapped Out Head Bitmap data structure may be maintained in memory by the selected device, and communicated to the host, via the results structures of FIGS. 10-11. A value of 1 in bit location 0 of the bitmap can be used to indicate that head 0 is mapped out (similarly, bit location 1 can be used for head 1, and so on). The decision to map out certain heads (or other areas of memory) can be specified by the host or the device, as desired. The selected device may update the bitmap during data recovery, based on the rate of retries during reads or other observed performance characteristics of the device.

If the SAS controller issues a read command for a head that is listed in the bitmap, the device can return a check condition status. The host will log the information and move to the next available LBA. The host will accumulate the non-returned LBAs and initiate reconstruction through external means, such as the remaining storage devices in the RAID set. As desired, a Force Unit Access (FUA) bit can be used with read commands to re-enable full error recovery by the selected device using one or more of the mapped out heads, and/or the currently operational heads.

In a SATA environment, a controller (e.g., host 608, FIG. 6) may initiate the Rapid Rebuild processing by issuing a Write Log Extended command, as shown in FIG. 12. This command can write specific log data to a write log data structure, as shown by 13. Corresponding read log data structures are shown in FIGS. 14 and 15, and are developed responsive to the write log structures. These data structures can be helpful in identifying the data requiring reconstruction by the other devices in the RAID set, and can be updated during processing.

Upon initiation of the rapid rebuild processing, as before the selected device enters a Rapid Rebuild mode and the device will carry out various preparatory steps including minimizing background activities, testing all heads, write-protecting the media, and limiting error recovery steps to free retries. The Rapid Rebuild mode will persist through any bus resets and remain active until the device is power-cycled by the host.

As before, the SATA controller may direct the outputting of the copied data by issuing a sequential read workload to extract the available data from the device, although such is not necessarily required as any suitable data exchange format between the device and the host can be used as the copied data are transferred over to the host by the device.

A Mapped Out Head Bitmap data structure may be maintained in memory by the selected device, and communicated to the host, via the write and read log extended data structures (FIGS. 13, 15). The decision to map out certain heads (or other areas of memory) can be specified by the host or the device, as desired. The selected device may update the bitmap during data recovery, based on the rate of retries during reads or other observed performance characteristics of the device.

The host may further maintain a SATA Queued Error Log data structure, as set forth by FIGS. 16A-16B. This structure will enable the host to keep track of which data are being transferred and which data require reconstruction. The error log can be used to direct the external reconstruction of the non-copied data.

In some embodiments, the host may issue a sequential read workload using Read FPDMA Queued commands to extract the available data from the device. When a command includes a head that is listed in the Mapped Out Head Bitmap, the device can return a Status register of 0x41 (standard error status return value for Read FPDMA Queued) and set the Error register to 0x24 (value chosen for the Rapid Rebuild failure). The error LBA and the next accessible LBA are then read by the host from the NCQ Error Log (log page 0x10) using the Read Log Ext or Read Log Ext DMA command in order to continue reading. As will be appreciated, in a SATA environment, after a Native Command Queuing (NCQ) error the device may not accept any new commands until the NCQ Error Log is read by the host.

If there were other outstanding Read FPDMA Queued commands at the time of the error, the other commands will be aborted due to SATA NCQ collateral abort. The error LBA will be stored in the standard bytes for the NCQ Error LBA in log page 0x10. The next accessible LBA will be stored in the first six bytes of the Vendor Specific area of the page (see FIG. 16B).

After a reported error, the host may restart the sequential read work at the next accessible LBA. The host maintains the list of LBAs that need to be rebuilt using RAID reconstruction. Depending on the system configuration, such reconstruction can be initiated as data continue to be copied from the selected device.

As before, a Force Unit Access (FUA) bit may be used with the Read FPDMA Queued command to re-enable full error recovery, and to disregard the list of mapped out heads on a per command basis. This will override the device to initiate full enhanced error recovery efforts by the device on an as-needed basis.

FIG. 17 shows a portion of a selected data storage device that is subjected to rapid rebuild processing in accordance with the foregoing discussion. FIG. 17 illustrates three data tracks from the selected device on which various LBAs (data sectors) are arranged using a serpentine format with 1000 sectors per track. A first track (TRACK 0) is serviced by a first transducer (HEAD 0) and stores LBAs 0-999. A second track (TRACK 1) is serviced by a second transducer (HEAD 1) and stores LBAs 1000-1999. A third track (TRACK 2) is serviced by the first transducer (HEAD 0) and stores LBAs 2000-2999. It will be appreciated that further tracks are provided with a similar format.

As discussed above, a host device initiates the rapid rebuild processing. This may be carried out such as by issuing a SAS Send Diagnostics Command (FIG. 8), by issuing a SATA Write Log Extended Command (FIG. 12), or in some other suitable fashion. It is contemplated in this example that the second transducer (HEAD 1) fails internal testing during initial characterization processing and is mapped out in the appropriate data structure. The mapped out head bitmap may be expressed as 0x0002 (bit 1, representing head 1, is set to one).

The host next issues a read command (such as a SAS Read Command or SATA Read FPDMA Queued Commands) for a selected amount of data, such as 800 blocks (sectors) of data starting at LBA 0. Since this range of LBA maps to HEAD 0, which is not mapped out, all the data are returned to the requesting host, and the command completes successfully.

The host next issues a second read command for another selected amount of data, such as the next 800 blocks starting at LBA 800. Data for LBAs 800-999 are successfully returned to the host, followed by an error response (SAS Check Condition and 0B/FB/01 sense data or SATA Status 0x41 Error 0x24) which indicates that the remainder of the command could not be successfully completed, since it requires access to a mapped out head.

At this point, the error LBA information available to the host (SAS sense data Information field or SATA NCQ Error Log page Error LBA) contains a value of 1000, which is the first LBA on a mapped out head (head 1) that the command encountered. The next accessible LBA (SAS sense data Command Specific Information field or SATA NCQ Error Log page Next Accessible LBA field) is 2000, the next sequential LBA on a non-mapped out head (head 0). The host will accordingly proceed to continue issuing read commands beginning at LBA 2000 (the next accessible LBA), and will proceed with reconstruction of the missing LBAs 1000-1999 from an external source.

It is noted that the host may adapt to the pattern of failures and adaptively adjust the requests for data so as to minimize the occurrence of error conditions. The device can be configured to provide a LBA-PBA conversion table to the host during the rapid rebuild preparation phase to enable the host to determine which data sets to request in view of the bitmap results. The host may use the conversion table to adjust requests for data to avoid requests for data associated with HEAD 1 (or any other mapped out heads).

More generally, any areas of the memory of the selected device can be identified by the selected device and omitted from servicing during a sequential or non-sequential read data transfer process, due to any detected error condition, including error conditions that are merely related to expected performance and do not necessarily involve an out-of-specification parameter of the device.

It will now be appreciated that various embodiments as disclosed herein can provide benefits over the prior art. The amount of data subjected to external reconstruction can be reduced, saving time and processing resources. The external data reconstruction can be carried out concurrently with the transfer of data copied over from the selected device.

While some embodiments disclosed herein have been described in terms of a RAID environment, such is merely exemplary and is not limiting. For example, the various embodiments can be readily adapted to other types of systems, including systems that utilize a single data storage device. Moreover, while various embodiments have contemplated the copying/reconstruction of all of the data on a selected device, such is not necessarily required. Rather, only certain types, ranges and/or amounts of data may be selected using the various techniques discussed herein.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A method comprising:
sending a rebuild signal from a host to a data storage device, the data storage device comprising a memory;
detecting an error condition associated with the data storage device responsive to receipt of the rebuild signal by said device;
transferring, to the host, data stored in a first portion of the memory unaffected by said error condition;
outputting, to the host, a communication signal that indicates that data stored in a second portion of the memory affected by said error condition will not be transferred to the host; and
using the host to reconstruct the data stored in the second portion of the memory.

2. The method of claim 1, in which the host reconstructs the data responsive to receipt of the communication signal concurrently with the transferring of the data stored in the first portion of the memory.

3. The method of claim 1, in which the data storage device forms a portion of a multi-device array comprising at least one additional data storage device, and the host uses data stored in said at least one additional data storage device to reconstruct the data from the second portion of the memory.

4. The method of claim 1, in which the memory comprises a disc-shaped recording medium.

5. The method of claim 1, in which the data storage device comprises a plurality of data recording surfaces accessed by a corresponding plurality of moveable data transducers, the detected error condition is associated with a selected one of said data transducers, and the second portion of the memory comprises a selected one of said data recording surfaces accessed by the selected one of said data transducers.

6. The method of claim 1, in which the data storage device is characterized as a first data storage device, the transferred data from the first portion and the reconstructed data from the second portion are stored on a second, replacement data storage device, and the method comprises a subsequent step of decoupling the first data storage device from the host.

7. The method of claim 1, wherein monitoring circuitry of the data storage device detects the error condition responsive to receipt of the said rebuild signal.

8. The method of claim 1, in which the using step comprises successfully reconstructing a first part of the data from the second portion of the memory using a mechanism that is external to the data storage device, unsuccessfully reconstructing a second part of the data from the second portion of the memory using said mechanism, and using the data storage device to subsequently transfer the second part of the data from the second portion of the memory.

9. The method of claim 1, in which the transferring step comprises write-protecting the memory prior to the transfer of the data from the first portion of the memory to the host.

10. The method of claim 1, in which the transferring step comprises limiting a read error recovery sequence to one or more free retries prior to the transfer of the data from the first portion of the memory to the host.

11. An apparatus comprising a data storage device coupled to a host, the data storage device comprising a memory and a controller which, responsive to a rebuild signal forwarded to the data storage device by the host, identifies an error condition, identifies a first portion of the memory unaffected by said error condition and copies data stored therein to the host, identifies a second portion of the memory affected by said error condition and outputs a communication signal that indicates data stored in said second portion will not be transferred to said host, the host operating responsive to the communication signal to externally reconstruct said data stored in the second portion.

12. The apparatus of claim 11, in which the host directs the reconstruction of the data from the second portion of the memory by an external mechanism concurrently with the transfer of the data by the data storage device from the first portion.

13. The apparatus of claim 11, in which the data storage device comprises a first data storage device, and the apparatus further comprises a second data storage device coupled to the host, wherein data stored on the second data storage device is used to reconstruct the data in the second portion of the memory of the first data storage device.

14. The apparatus of claim 11, in which the rebuild signal indicates a requirement by the host that the data storage device copy data stored in the memory of the data storage device to a target device.

15. The apparatus of claim 11, in which the host is adapted to successfully reconstruct a first part of the data from the second portion of the memory using a mechanism that is external to the data storage device, to unsuccessfully reconstruct a second part of the data from the second portion of the memory using said mechanism, and instruct the data storage device to subsequently copy the second part of the data from the second portion of the memory responsive to said unsuccessful reconstruction of the second part of the data.

16. The apparatus of claim 11, in which the data storage device has a sequence of read error recovery routines available for use during data read operations to recover data, the data storage device deactivating said read error recovery routines during the copying of the data from the first portion of the memory.

17. A data storage device, comprising:
a memory having an associated error condition; and
a controller which, responsive to the error condition, copies a first set of data stored in the memory not affected by said error condition to the host, and forwards a notification signal to the host in lieu of copying a second set of data stored in the memory that is affected by said error condition to enable the host to externally reconstruct the second set of data, wherein the error condition is characterized as an anticipated data transfer rate lower than a rate at which the host can direct the external reconstruction of the data.

18. The data storage device of claim 17 characterized as a disc-based data storage system, wherein the error condition comprises a data read/write transducer failure condition.

19. The data storage device of claim 17, wherein the error condition is detected by the data storage device responsive to a rebuild signal forwarded to the data storage device by the host.

20. The data storage device of claim 17, in which the data storage device forms a portion of a multi-device RAID.

* * * * *